Figures 2, 3, 12:
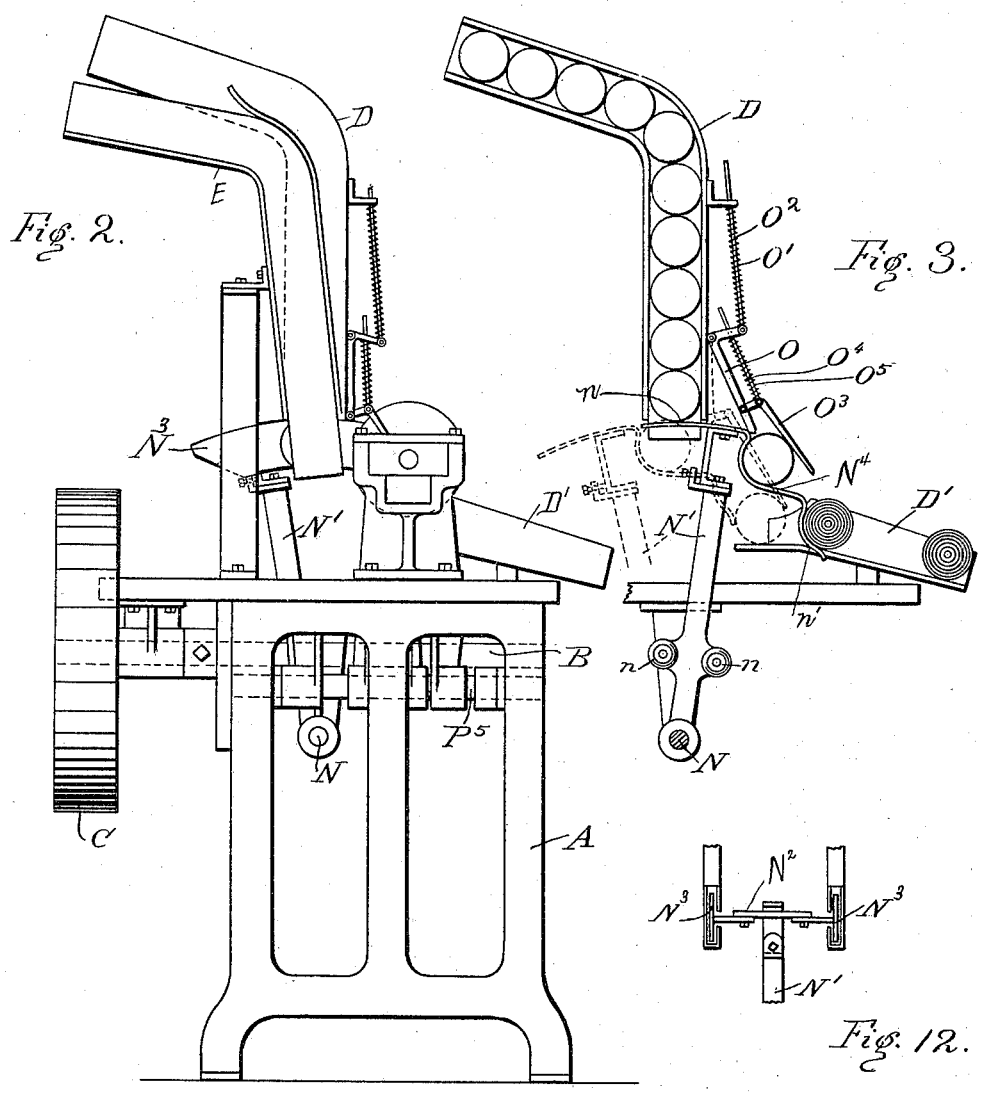

(No Model.) 4 Sheets—Sheet 1.
E. P. HOLDEN.
CAN HEADING MACHINE.
No. 598,566. Patented Feb. 8, 1898.
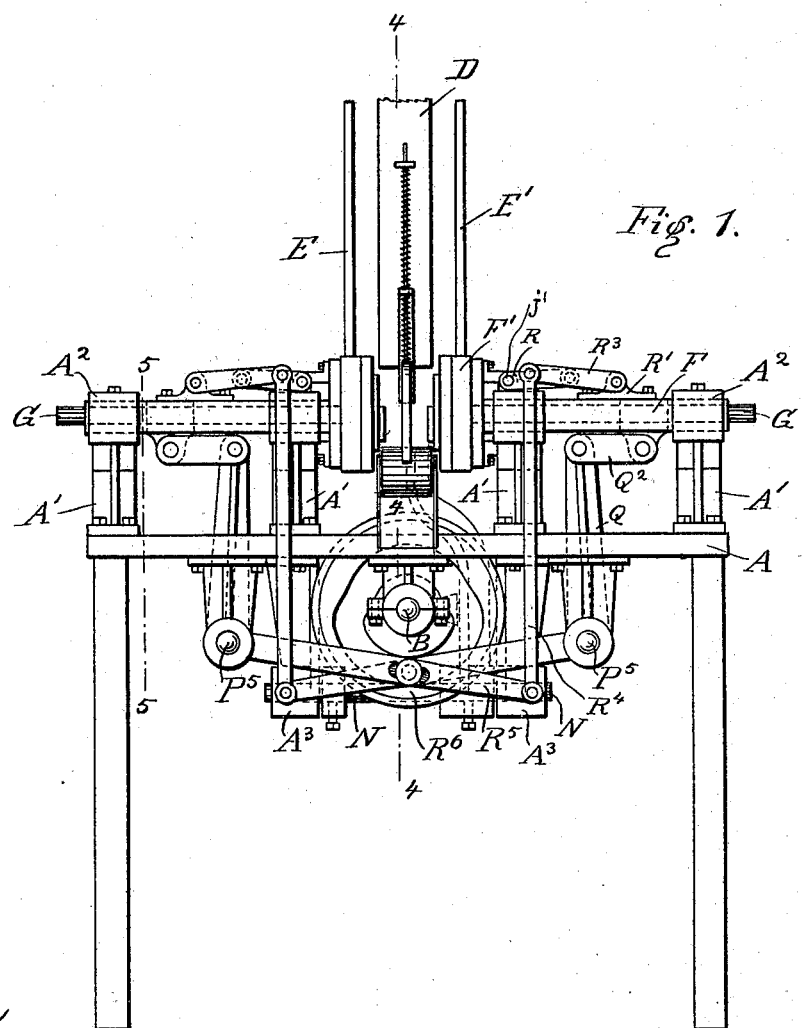
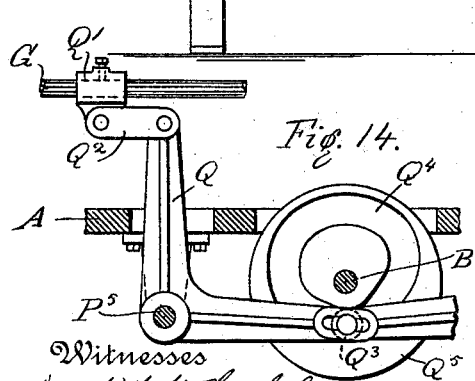
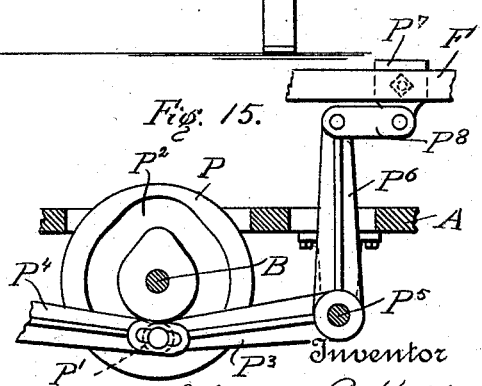
Witnesses
Inventor
Edward P. Holden
By his Attorney (No Model.) 4 Sheets—Sheet 2.

E. P. HOLDEN.
CAN HEADING MACHINE.

No. 598,566. Patented Feb. 8, 1898.

Witnesses
Inventor
Edward P. Holden
By his Attorney

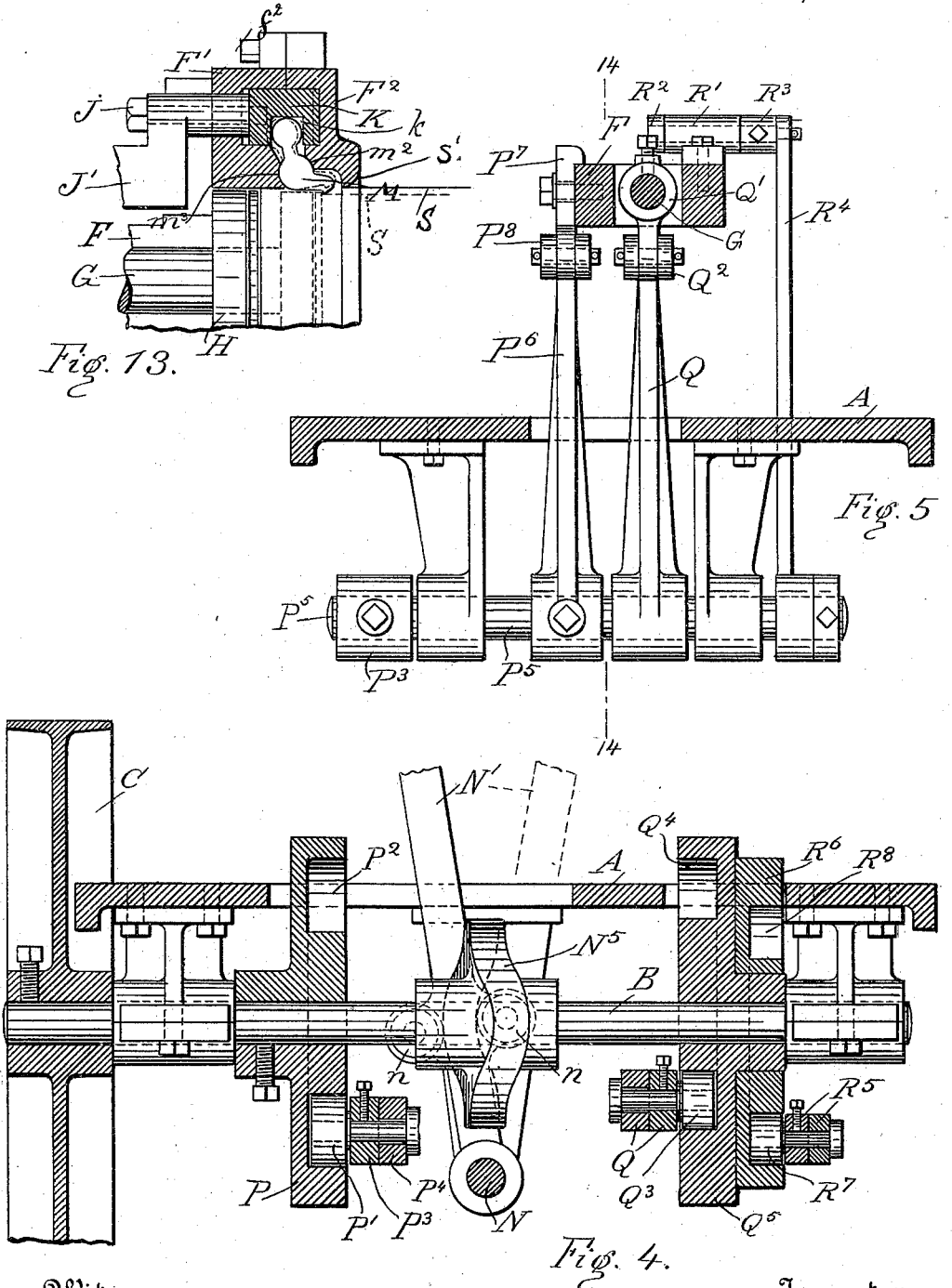

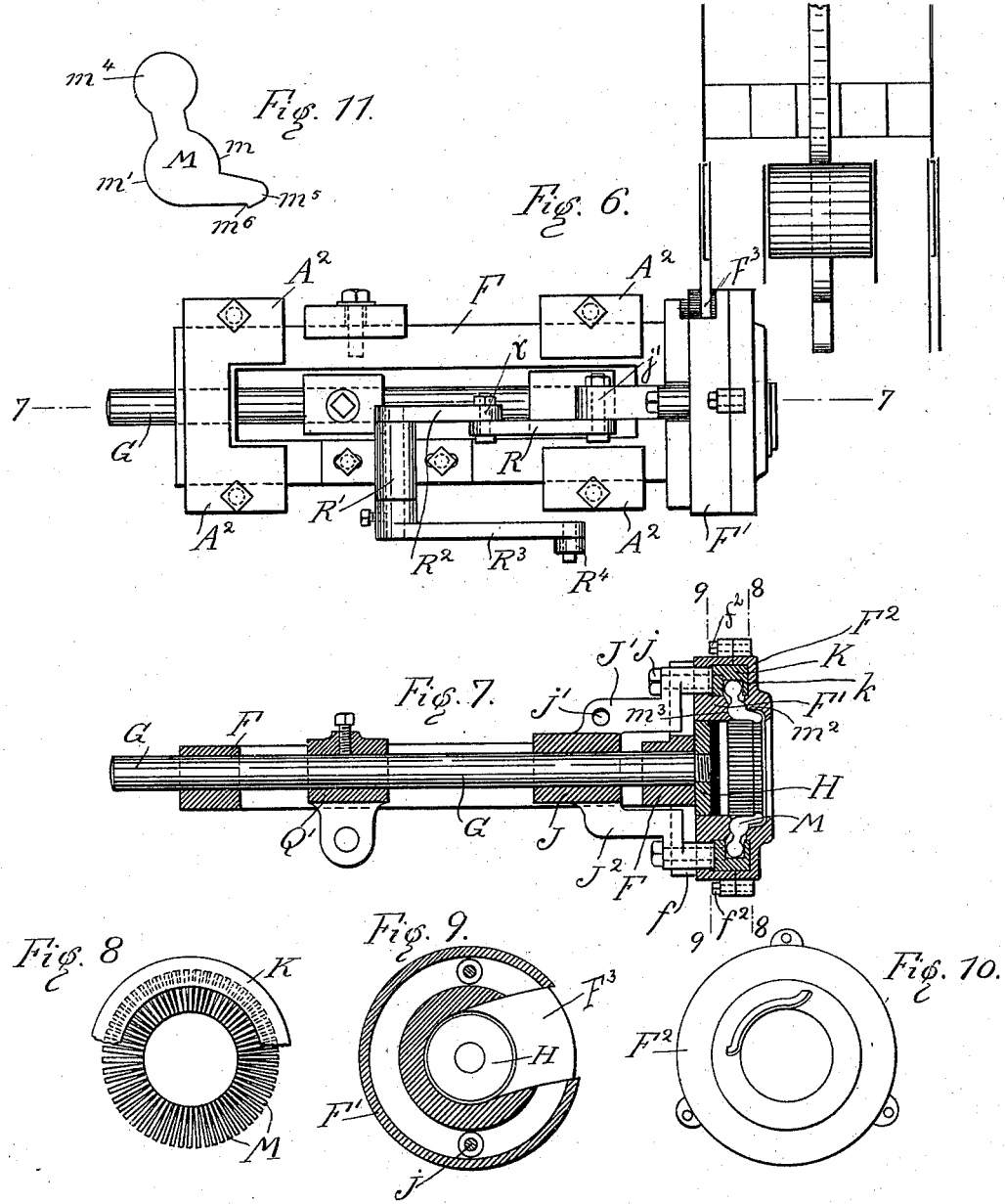
(No Model.) 4 Sheets—Sheet 4.
E. P. HOLDEN.
CAN HEADING MACHINE.
No. 598,566. Patented Feb. 8, 1898.

UNITED STATES PATENT OFFICE.

EDWARD P. HOLDEN, OF CHICAGO, ILLINOIS.

CAN-HEADING MACHINE.

SPECIFICATION forming part of Letters Patent No. 598,566, dated February 8, 1898.

Application filed August 3, 1896. Serial No. 601,496. (No model.)

*To all whom it may concern:*

Be it known that I, EDWARD P. HOLDEN, a citizen of the United States, residing at Chicago, county of Cook, State of Illinois, have invented a certain new and useful Improvement in Can-Heading Machines; and I declare the following to be a full, clear, and exact description of the invention, such as will enable others skilled in the art to which it pertains to make and use the same, reference being had to the accompanying drawings, which form a part of this specification.

My invention has for its object the production of a can-heading machine—that is, a machine adapted to place the ends or heads on the bodies of sheet-metal cans; and it consists in a combination of devices and appliances hereinafter described and claimed.

In the drawings, Figure 1 is a front elevation of the machine. Fig. 2 is a side elevation. Fig. 3 is a detail illustrating the can-feeding mechanism. Fig. 4 is a sectional view on the line 4 4 of Fig. 1. Fig. 5 is a sectional view on the line 5 5 of Fig. 1. Fig. 6 is a plan view of one of the reciprocating heads. Fig. 7 is a section on the line 7 7 of Fig. 6. Fig. 8 is a sectional view on the line 8 8 of Fig. 7. Fig. 9 is a sectional view on the line 9 9 of Fig. 7. Fig. 10 is an end elevation of the head. Fig. 11 is a detail of one of the bell-crank levers. Fig. 12 is a front elevation of the feeding-head. Fig. 13 is an enlarged detail of the portion of the head shown in Fig. 7. Figs. 14 and 15 are details illustrating the cam movements.

In carrying out the invention, A represents the main frame of the machine, B the main shaft, C the drive-wheel.

Referring to Fig. 1, it will be seen that there is a can-runway D, down which the cans are fed, and on each side thereof can-head runways E E', down which the can-heads are fed.

A' are suitable standards extending from the main frame A, having bearings in their upper ends $A^2$ to support the reciprocating parts of the heading mechanism, as hereinafter explained.

F is a reciprocating frame carried in the bearings $A^2$. (Shown in detail in Figs. 6 and 7.)

G is a stem movable in the reciprocating frame F and having on its end a plate H. On this stem, supported by the bearing J, is a frame made up of two arms J' $J^2$, one being above and the other below the stem, these arms extending through the flange $f$ of the reciprocating frame F and engaged to a ring K by screws $j$.

F' is a ring engaged to the flange $f$ of the reciprocating frame F. Engaged to the face of the ring F' by the bolts $f^2$ is another ring $F^2$. The ring F' and the ring $F^2$ have their opposing faces channeled to receive the ring K, the channel for said ring K being slightly larger than the ring, so that the latter may reciprocate therein.

M is a series of what may be termed "bell-crank levers," shaped, as shown in Fig. 11, with rounded bearing-surfaces $m$ $m'$ to fit in the corresponding rounded faces $m^2$ $m^3$ of the rings F' $F^2$. Each of the levers is rounded on its end, as at $m^4$, to fit in the channel $k$ in the face of the ring K, while the other end of the lever is provided with a rounded end $m^5$ and a shoulder $m^6$.

It will be observed by reference to Fig. 8 that the entire circumference of the rings is filled with the levers M. In the face of the ring F' is an opening or slot $F^3$, (shown in Figs. 6 and 9,) the can-head terminating adjacent to this slot or opening. Supported from suitable hangers $A^3$, Fig. 1, is a shaft N. Pivoted on this shaft is an arm N', Fig. 3, carrying on its upper end a cross-head $N^2$, Fig. 12. The latter is shaped with a pusher-plate $N^3$ at each end for feeding the can-heads and with a circular portion $N^4$ for feeding the can-bodies.

On the main shaft B of the machine, as shown in Fig. 4, is a cam $N^5$, and on the arm N' are rollers $n$, one for each side of the cam, so that as the cam is revolved the arm N' is reciprocated, and consequently the cross-head or feeding-head is thrown forward and back.

O, Fig. 3, is a bell-crank lever pivoted to the face of the runway D, one end terminating closely adjacent to the lower end of said runway, while to the other end is pivoted a rod O' with a spring $O^2$ bearing on the end of the bell-crank lever O, the tendency being to keep the lower end or long arm against the runway D. Pivoted to this long arm is another lever $O^3$, the end of which extends down adjacent to the delivery-chute D'. A rod $O^4$, pivoted to the lever $O^3$ and passing through the short arm of the lever O, carries a spring $O^5$, which bears upon the lever $O^3$ and tends normally to keep the latter upon the can which is fed against it.

On the main shaft B, Fig. 4, is a cam P for reciprocating the frame F, and consequently the head as a whole. This is accomplished by means of the roller P', traveling in the cam-groove $P^2$.

$P^3$ $P^4$ are levers to which the roller P' is pivoted, each extending to a shaft $P^5$, Figs. 5 and 15. On this shaft is an arm $P^6$, which extends up to a point adjacent to the reciprocating frame F. Engaged to this frame is an arm $P^7$, and a link $P^8$ is pivoted to the arm $P^7$ and to the upper end of the lever $P^6$, thus connecting them. Thus a revolution of the cam P tends to alternately elevate and depress the joined ends of the levers $P^3$ $P^4$, and each frame F is thus reciprocated. On each shaft $P^5$, on each side of the machine, is a lever Q, and as both sides of the machine are duplicates I will proceed to describe but one side. Q' is an arm keyed to the stem G, Figs. 5 and 14, and connected with the upper end of the lever Q by the link $Q^2$. The lever Q is a bell-crank lever with the end provided with a roller $Q^3$, which travels in the cam-groove $Q^4$ of the cam $Q^5$, so that as the shaft is revolved the lever Q is tilted, and consequently reciprocates the stem G, and as the levers Q for each side of the machine are pivoted together, as shown in Figs. 4 and 14, both stems G will be simultaneously reciprocated. Pivoted at $j'$ to the frame J is a link R, Figs. 1 and 6. Supported on the reciprocating frame F is a bearing R', carrying a shaft on which the two arms $R^2$ $R^3$ are engaged, the end of the link R being pivoted to the end of the arm $R^2$. Pivoted to the end of the arm $R^3$, Fig. 1, is a rod $R^4$, which extends down and is pivoted to a lever $R^5$, and the other end of the said lever $R^5$ being pivoted on the shaft $P^5$ on the opposite side of the machine, Fig. 1. This causes the two levers $R^5$ to cross each other, and at the point where they cross is provided a roller $R^7$, which travels in the cam-groove $R^8$ of the cam $R^6$, the latter being on the shaft B. Thus a revolution of the cam $R^6$ alternately raises and lowers the two levers $R^5$, and they, through the rods $R^4$ and links $R^3$, reciprocate the frame J.

The operation is as follows: A revolution of the main shaft B operates the entire mechanism, and I will first describe the operation of the can-head-feeding mechanism. A revolution of the cam $N^5$ on the shaft B causes the arm N' to reciprocate back and forth underneath the can and can-head chutes D E E'. The portion $N^4$ of the cross-head on the arm N' picks up a can and throws it forward, as shown in Fig. 3, the flat portion $n$ serving to keep the balance of the cans in the chute. The lever $O^3$ holds the can in place while the heads are being put on, and as the arm N' recedes to pick up another can the can will drop to the delivery-chute D' and be held there by the lever $O^3$ until the arm N' again comes forward, when the portion $n'$ will serve to throw the can down the chute, as shown in Fig. 3. The feeding of the can-heads is simultaneous with the can-bodies, the can-heads being thrown forward into the heading mechanism by the cross-heads $N^3$. (Shown in Figs. 2 and 12.) As the can-bodies and can-heads reach their respective positions the cans are so arranged that the cam $Q^5$ will first come into play and will, through the lever Q and link $Q^2$, throw the stem G, Fig. 7, forward, carrying with it the head H, which, engaging the can-head, forces the latter to the position shown by the dotted lines, Fig. 13. As soon as this is accomplished the cam P comes into play, and through the levers $P^3$ $P^6$ and link $P^8$ the frame F, and consequently the entire head, is moved forward, so that the end of the can-body is caused to enter the head, as shown by the dotted lines S, Fig. 13. The end of the can-body is guided into its can end by the beveled face S' of the head and beveled face $m^5$ of the levers M. Up to this time the cams P $R^6$ have moved simultaneously or in unison; but as soon as the can-body has entered the can-head the arrangement of the cams is such that the rod $R^4$ will, through the lever $R^5$ and cam $R^6$, be thrown upward, and this action through the shaft R', link $R^2$, and link R will draw back the fitting J, and consequently will move the ring K in its bearing, and the movement of the ring K will tilt the bell-crank levers M and throw the end $m^6$ upward, as shown by the dotted lines in Fig. 13, thus releasing the can-head. The cam P now comes into play again and draws back the frame F, the stem G and head H remaining stationary, however, to hold the can-head in place on the can-body until the main head is drawn back entirely clear of the can-body, when the cam $Q^5$ again comes into play and carries the stem G and head H back, when the can drops down, as shown in Fig. 3, to the delivery-chute D' and is carried away.

It is of course obvious that many details of the above-described construction might be altered without departing from the spirit of my invention.

What I claim is—

1. In a can-heading machine the heading apparatus thereof, consisting of a head provided with mechanism for picking up and advancing the can-head, mechanism for engaging and holding the can-head, mechanism for advancing the entire head onto the end of the can-body, mechanism for moving the said holding mechanism to release the can-head on the body, and mechanism for retracting said can-head-advancing mechanism after the can-head has been released, substantially as described.

2. In a can-heading machine, the heading apparatus thereof consisting of a head provided with mechanism for picking up and advancing the can-head mechanism for engaging and holding the can-head, said latter mechanism constituting also the centering mechanism for the can-body end, mechanism for advancing the entire head onto the end of the can-body, mechanism for moving the said holding mechanism to release the end of the can-body and its accompanying head, and mechanism for retracting said can-head-advancing mechanism after the head has been withdrawn, substantially as described.

3. In a can-heading machine, a reciprocating head for pressing the can-heads onto the can-bodies, said head carrying a series of radially-movable levers for holding the can-head while it is being pressed onto the can-body, substantially as described.

4. In a can-heading machine, a reciprocating head carrying an inner head adapted to advance the can-head, mechanism for positively reciprocating the latter, a series of radially-movable levers against which the can-head will strike and by which it is held, and mechanism for tilting said levers away from the can-head before said inner head leaves the can-head, substantially as described.

5. In a can-heading machine a reciprocating head provided with a series of radially-moving projections adapted to engage and hold the can-head, an inner head adapted to engage and advance the can-head against said projections, mechanism for positively reciprocating the latter and mechanism for withdrawing or moving said projections radially before the inner head leaves the can-head, substantially as described.

6. In a can-heading machine, a reciprocating head, a reciprocating ring carried by said head, means for reciprocating the ring in a line parallel to the length of the head, a series of bell-crank levers one arm of each being engaged by said reciprocating ring and shoulders on the opposite arm of each adapted to engage and hold the can-head, substantially as described.

7. In a can-heading machine the reciprocating head composed of two parts, a reciprocating ring embraced by said parts, a series of bell-crank levers, one arm of each being engaged by said reciprocating ring, and shoulders on the opposite arm of each adapted to engage and hold the can-head, substantially as described.

8. In a can-heading machine, a reciprocating head composed of two parts, a reciprocating ring embraced by said parts, a series of bell-crank levers formed with bearing-surfaces at the angle of the two arms, bearing-surfaces on the two parts of the head in which the bearings on the levers rest, one end of each lever being engaged by the reciprocating ring, the other end of each lever provided with a shoulder adapted to engage and hold the can-head, substantially as described.

9. In a machine for operating on sheet-metal vessels, a chute carrying the cans, an oscillating plate provided with means for engaging the lower can and moving it away from the chute and a portion on said plate adapted as the plate advances to close the end of the chute, substantially as described.

10. In a machine for operating on sheet-metal cans, a vertical chute for holding the can-bodies, an oscillating plate beneath the end of said chute, said plate provided with a concave surface for engaging a can-body, means in front of said plate for holding the can-body on the concave surface, and a comparatively flat portion of said plate adapted as the lower can-body is picked up and advanced to close the end of the chute, substantially as described.

11. In a can-heading machine, a chute for the can-bodies, and one or more chutes for the can-heads, an oscillating arm carrying a plate for engaging the lower can-body and a plate for engaging each can-head, each of said plates shaped with one portion to engage the can-body or can-head and another portion adapted to close the end of the chute, substantially as described.

12. In a can-heading machine, a chute for the can-bodies, an oscillating plate having a concave surface in which a body drops and an arm yieldingly held against the can-body to hold it in said concave surface, substantially as described.

13. In a can-heading machine, a chute for the can-bodies, a reciprocating plate having a concave surface adapted to engage and hold a can-body, a yielding arm adapted to hold the body in said concave surface, and another yielding arm pivoted to the first arm and adapted to discharge the body after it has been headed, substantially as described.

14. The combination with the chute D for the can-body, of the lever O, and spring $O^2$ for exerting pressure on the arm, and the arm $O^3$ pivoted to said lever O and spring $O^5$ for exerting pressure on the arm $O^3$, substantially as described.

In testimony whereof I sign this specification in the presence of two witnesses.

EDWARD P. HOLDEN.

Witnesses:
   DE WITT W. CHAMBERLIN,
   WALTER H. CHAMBERLIN.